United States Patent [19]
Warner

[11] Patent Number: 5,234,041
[45] Date of Patent: Aug. 10, 1993

[54] TRACTION BOOT FOR TIRES

[75] Inventor: Joseph G. Warner, Sterling Heights, Mich.

[73] Assignee: The United States of America as represented by the Secretary of the Army, Washington, D.C.

[21] Appl. No.: 866,648

[22] Filed: Apr. 8, 1992

[51] Int. Cl.$^5$ .............................. B60C 27/08
[52] U.S. Cl. ............................ 152/175; 152/179
[58] Field of Search ............ 152/167, 168, 170, 173, 152/175, 179, 185, 187, 191, 221

[56] References Cited

U.S. PATENT DOCUMENTS

| | | | |
|---|---|---|---|
| 1,050,798 | 1/1913 | Bowden | 152/170 |
| 3,154,126 | 10/1964 | Katter | 152/187 |
| 3,435,873 | 4/1969 | Weier | 152/191 |
| 4,108,229 | 8/1978 | Herman | 152/175 |
| 4,237,950 | 12/1980 | Domes et al. | 152/175 |
| 4,408,646 | 10/1983 | Forsyth | 152/191 |
| 4,752,105 | 6/1988 | Barnard | 152/191 |

FOREIGN PATENT DOCUMENTS 0132333 1/1985 European Pat. Off. .

Primary Examiner—Michael W. Ball
Assistant Examiner—Francis J. Lorin
Attorney, Agent, or Firm—Peter A. Taucher; David L. Kuhn

[57] ABSTRACT

The invention is a flexible boot that wraps around a tire to vary the tractive effect of a tire. The boot is a band with a different tread pattern on either side, and the treads may have different tractive effects depending on which way the tread rotates relative to the ground. Either tread pattern can be configured to hold the boot on the tire if that pattern faces radially inwardly on the tire.

8 Claims, 3 Drawing Sheets

5,234,041

TRACTION BOOT FOR TIRES

GOVERNMENT USE

The invention described herein may be manufactured, used and licensed by or for the U.S. Government for governmental purposes without payment to me of any royalty.

BACKGROUND

My invention relates to devices installed on tires to adapt their tractive effect to varying surface conditions over which the vehicle travels. Known devices of this nature include tire chains or a loop of track connecting fore and aft wheels of a tandem axle assembly. There are disadvantages with these known devices. For example, tire chains tend to harm road surfaces and are therefore outlawed in many states, and loops of tracks are only effective for vehicles with tandem axles.

SUMMARY

My invention is a boot or temporary recap for a tire that can be installed on any tire or any arrangement of tires. The boot has a tread pattern on either side of a flexible band which can wrap about the tire with either pattern faced outward while the remaining pattern helps to hold the boot on the tire. One or both of the tread patterns can be configured to have different tractive effects when rotating in different angular directions. The boot can be installed on a tire so that a chosen tractive effect for a given tread pattern can be associated with forward motion of the vehicle.

DETAILED DESCRIPTION

Figure 1:
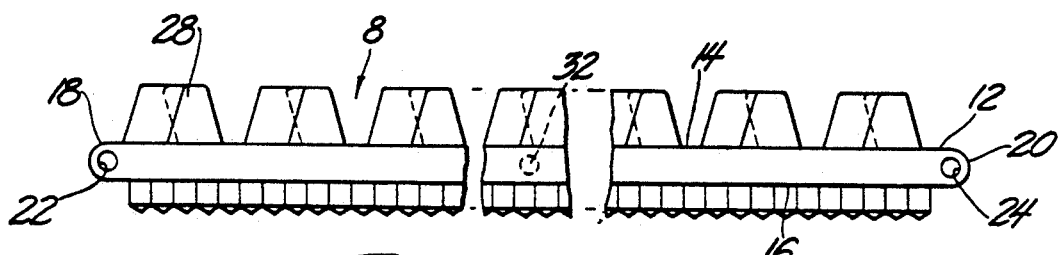
FIG. 1 is a side elevational view of my boot in a free state.
Figure 2:
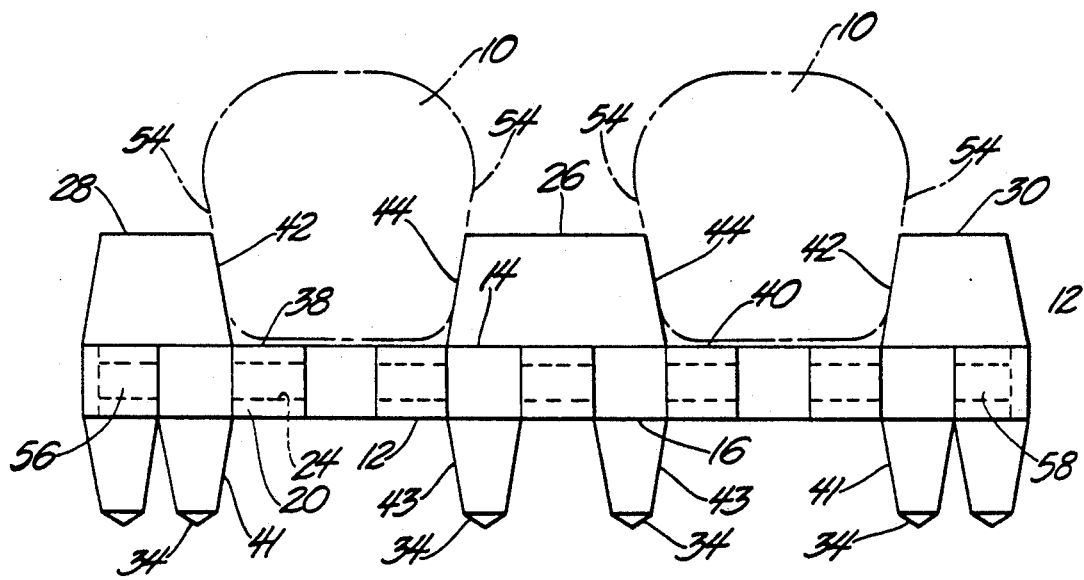
FIG. 2 is an end elevational view of my boot.
Figure 3:
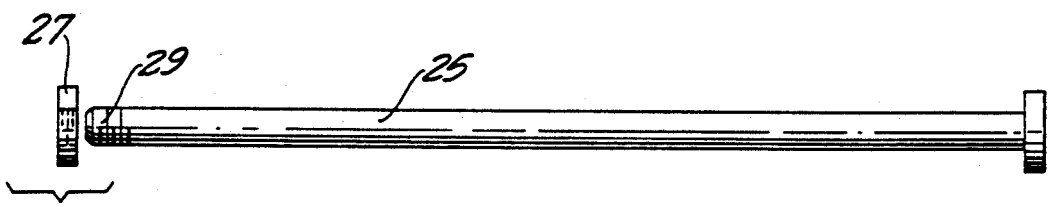
FIG. 3 is a side elevational view of a threaded pin and nut used to fasten ends of the boot together.

FIGS. 1 and 2 show an elongate boot 8 adapted to be wrapped about the circumferences of paired set of vehicle tires 10 of a dual wheel assembly (not shown). The boot has a flexible central band 12 that can be made with materials and processes generally similar to those for existing tire carcasses. Band 12 differs from known tire carcass structure in that it has a straight, flat configuration in its free state as opposed to the circular shape of a carcass in its free state. Additionally, band 12 will have sufficient longitudinal flexibility so that it can be wrapped onto tires 10 with either chevroned face 14 or knobbed face 16 engaged with the tires. Traction elements such as half chevrons 28, full chevrons 26 and knobs 34 can be spaced longitudinally on band 12 so that they will not interfere with one another when at the inner diameter of a wrapped band. Opposed faces of neighboring traction elements can also be sloped so that the these opposing faces do not mutually interfere when at the aforementioned inner diameter.

Figure 8:
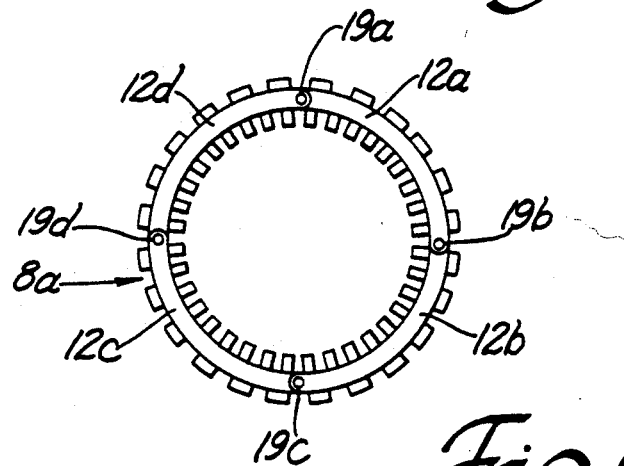
FIG. 8 is a side elevational view of an alternate embodiment of the boot. The embodiment is shown in the circular configuration it has when wrapped about a tire.

At either end of band 12 are gudgeon tabs 18 and 20 having apertures 22 and 24 respectively. The tabs are closely interdigitated when the ends of band 12 are brought together to register apertures 22 with apertures 24. The ends of band 12 can then be fastened together by bolt 25 through the interdigitated tabs, there being a nut 27 engaged to threaded end 29 to keep the bolt in place. It is possible that the tabs and bolt will cause a rotational imbalance in the assembly of boot 8 and tires 10, whereby it may be preferable to have a counterweight 32 imbedded in band 12 at a zone where the counterweight will be diametrically opposed to the position of pin 25 when boot is on tires 10. In the alternative, as shown by boot assembly 8a in FIG. 8, the boot may be comprised of a plurality of identical segments such as 12a, 12b, 12c, and 12d in that figure. Pins and tabs for connecting the segments together can be at equally circumferentially spaced locations such as 19a through 19d in FIG. 8. Pairs of the spaced locations can be diametrically opposed to one another.

Figure 4:
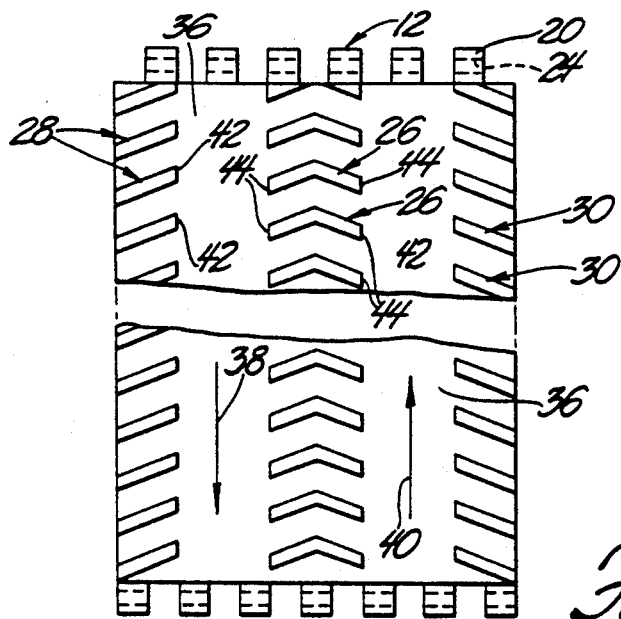
FIG. 4 is a top elevational view of the boot showing a first tread pattern.

FIG. 4 shows a bidirectional tread pattern formed by chevrons 26, half chevrons 28 and half chevrons 30. The tread pattern is "bidirectional" because its tractive effects differ depending upon whether boot 8 acts on the ground in direction 38 or direction 40. When boot 8 acts in direction 38, the chevrons will point in the direction of vehicle travel and the tires have a better grip on relatively softer terrains. However, if boot 8 acts in direction 40, the chevrons point backward relative to the direction of vehicle travel and the tire will roll straighter and have a smoother ride on relatively flatter, harder terrains. Depending on how boot 8 is installed on tires 10, either direction 38 or 40 can be associated with forward rolling of tires 10, whereby boot 8 is capable of adapting tires 10 to varying ground conditions. The bidirectional chevron pattern is interrupted by two elongate beds 36 which bear against the outer circumferential surface of the tires when band 12 is installed on the tires with knobs 34 out. The width of beds 36 is preferably the same width as the ground engagement faces of tires upon which the band is installed.

Figure 6:
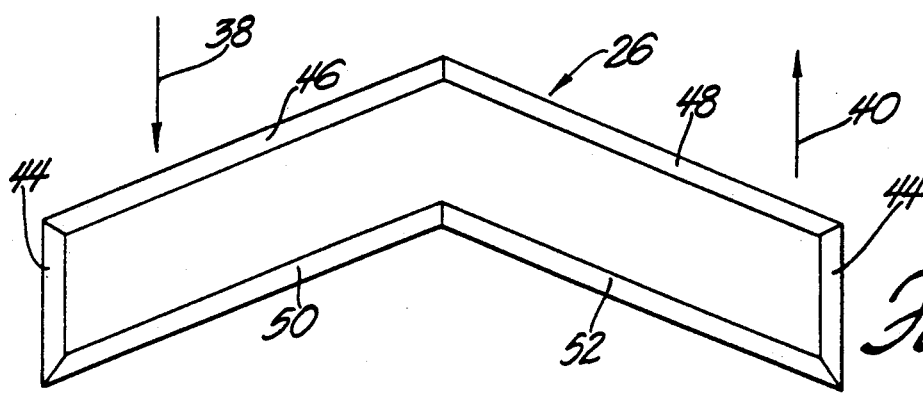
FIG. 6 is a detail view of a chevron from the tread pattern shown in FIG. 4.

An enlarged, detailed view of an individual chevron 26 from FIG. 4 is shown in FIG. 6. Chevron has a first pair of sloped surfaces 46 and 48 facing generally in direction 40 and an opposed pair of sloped surfaces 50 and 52 faced generally in direction 38. Additionally, chevron 26 has lateral sloped surfaces 44 which bear against tire 10 as seen in FIG. 2. It will be understood that half chevrons 28 and 30 have sloped surfaces similar to those of chevron 26.

Referring now to FIG. 2, band 12 is installed on tires 10 of a dual tire set such that tires 10 rest on beds 36 while respective lateral surfaces 42 and 44 bear against the side walls of the tires, whereby the beds and lateral surfaces form interrupted channels or channel-like structures that are receptacles for the tires. It is noted that some of knobs 34 have lateral surfaces 41 and 43 that are capable of bearing against tire 10. Surfaces 41 and 43 face in generally the same respective directions as surfaces 42 and 44 and lie in the same respective general planes as surfaces 42 and 44. To ease installation of band 12, it may be preferred to at least partly deflate the tires, wrap band 12 thereon and then re-inflate the tires.

Band 12 has edge zones 56 and 58 which extend laterally beyond the width of the tire and that the bases of the half chevrons span the width of the edge zones. The half chevrons function as solids braces between tires 10 and respective edge zones 56 and 58 thereby countering reaction force of the ground. This reaction force tends to bend the edge zones upward and inward toward the tires, thereby reducing the effective tractive width of the band-tire assembly and reducing the digging depth of knobs 34. The half chevrons can therefore be regarded as means to maximize the band-tire assembly tractive width and knob digging depth.

Figure 5:
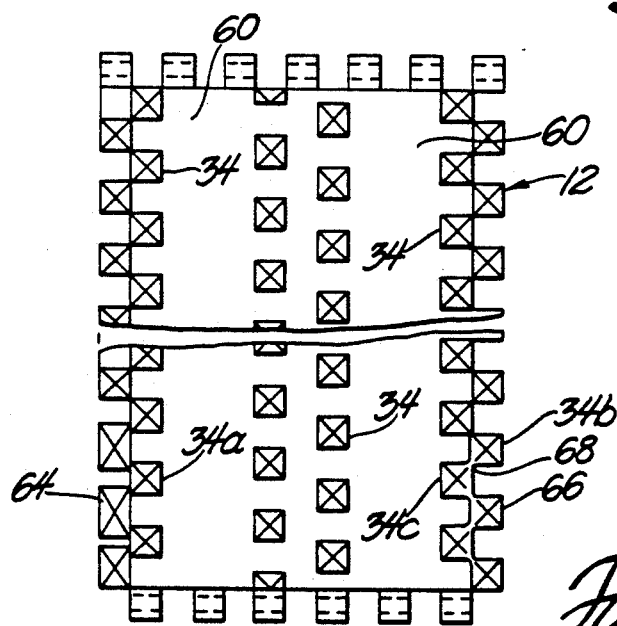
FIG. 5 is a bottom elevational view of the boot showing a second tread pattern thereon.

FIG. 5 shows the knobbed face of band 12 which has beds 60 for receiving tires 10 in the same fashion as do beds 36. The surfaces of knobs 34 adjoining beds 60 will bear against the side walls of tires 10 in the same fashion as the lateral surfaces 42 and 44 on the half chevrons and full chevrons. Knobs 34 are all integral with band 12 but are not connected to each other, whereby knobs 34 do not fully support the outermost portion of edge zones 56 and 58 against upwardly inward bending when the chevroned side of band 12 bears upon the ground. It may in some cases be desired to dimension and juxtapose knobs so that the laterally outermost knobs, as at 64, will interfere with laterally inwardly adjacent knobs, as at 34a. It may alternatively be desired to connect knobs 34b by webs or walls 68 to knobs 34c so that all of the knobs resist the aforementioned upwardly inward bending of edge zones 56 and 58.

Figure 7:
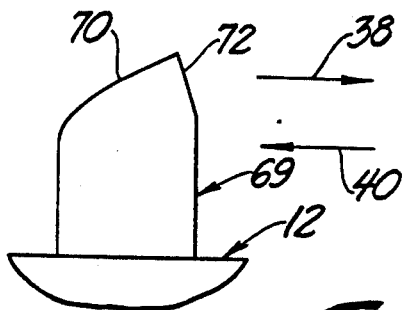
FIG. 7 is side elevational view of an alternate embodiment of a knob for the tread pattern shown in FIG. 5.

FIG. 7 illustrates alternate knob 69 having differently angled ground engagement faces 70 and 72, face 72 being intended for more aggressive digging action. It is contemplated that all of faces 70 will face in direction 38 and that all of faces 72 will face in direction 40 and that knobs 79 will be arrayed on band 12 in the same fashion as shown in FIG. 5. The resulting tread pattern can engage the ground in either direction 38 or 40 and will therefore be "bidirectional" in the same sense as the chevroned pattern shown in FIG. 4. Again like the chevroned pattern and depending on how boot 8 is installed on tires 10, either direction 38 or 40 can be associated with forward rolling of tires 10, whereby boot 8 is capable of adapting tires 10 to varying ground conditions.

Figure 9:
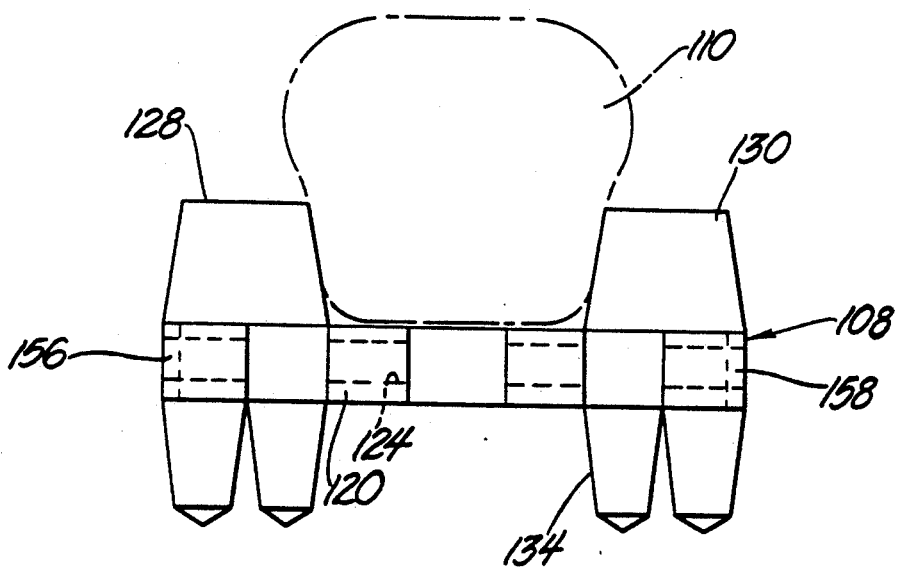
FIG. 9 is an end elevational view of still another embodiment of the boot.

FIG. 9 shows an alternate embodiment 108 of the traction boot configured for installation on a single tire 110. Half chevrons 128 and 130 are similar in structure to analogous half chevrons 28 and 30 in FIG. 2 and knobs 134 are similar to knobs 34 in that figure. Likewise, edge zones 156 and 158 correspond to edge zones 56 and 58 while tabs 120 and apertures 124 correspond to tabs 20 and apertures 24 in FIG. 2.

I wish it to be understood that I do not desire to be limited to the exact details of construction shown and described herein since obvious modifications will occur to those skilled in the relevant arts without departing from the spirit and scope of the following claims.

I claim:

1. A traction boot encircling a tire, the boot comprising:

a flexible band having two opposed faces;
a first array having first traction elements on one of the opposed faces of the band;
a second array having second traction elements on another opposed face of the band, the second traction elements being differently configured than the first tractive elements;
the first array having two first array subsets disposed along the band;
an elongate mediate portion of the one opposed face disposed between the first array subsets and bearing against tread of the tire;
surfaces of at least some first traction elements adjacent the elongate mediate portion and faced toward and bearing against side walls of the tire thereby holding onto the tire;
wherein a elongate mediate portion between the first array subsets is the first elongate portion, the second array has two second array subsets disposed along the band, an elongate mediate portion of the other opposed face is disposed between the second array subsets and is a second elongated portion surfaces of at least some first traction elements adjoin the first elongate portion so as to form together with the first elongate portion a first channel-like structure, and surfaces of at least some second traction elements adjoin the second elongate portion so as to form together with the second elongate portion a second channel-like structure.

2. The boot of claim 1 wherein the arrays form tread patterns whose tractive effect on a ground surface changes when a rotational direction of the tire is reversed.

3. The boot of claim 1 wherein,
the band comprises a plurality of band segments;
means at ends of each of the band segments for connecting the band segments together, the connecting means being disposed at equal angular intervals when the band encircles the tire.

4. The boot of claim 3 wherein:
two band segments the band comprises; and
one connecting means is diametrically opposed to another connecting means.

5. The boot of claim 1 further comprising an edge zone of the boot extending laterally beyond the tire.

6. The boot of claim 5 wherein supportive first traction elements are disposed on the edge zone and protrude in a generally radial direction with respect to the edge zone, the traction elements having engagement surfaces bearing against the tire, whereby the supportive first traction elements act as a brace between the tire and the edge zone.

7. The boot of claim 6 wherein the supportive first traction elements span the entire lateral width of the edge zone.

8. The boot of claim 7 wherein supportive second traction elements are disposed on the edge zone and protrude from the edge zone in an opposite direction from the generally radial direction of the first traction elements, the supportive second traction elements having element faces oriented in the same general direction as the engagement surfaces and lying in the same general plane as the engagement surfaces.

* * * * *